(12) United States Patent
Meier

(10) Patent No.: US 10,401,861 B2
(45) Date of Patent: Sep. 3, 2019

(54) PERFORMING WATER SLIP CONTROL OF A WATERCRAFT

(71) Applicant: Robert Bosch GmbH, Stuttgart (DE)

(72) Inventor: Michael R. Meier, Walled Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 15/263,050

(22) Filed: Sep. 12, 2016

(65) Prior Publication Data
US 2018/0074503 A1   Mar. 15, 2018

(51) Int. Cl.
*G05D 1/02*      (2006.01)
*B63J 99/00*     (2009.01)

(52) U.S. Cl.
CPC ....... *G05D 1/0206* (2013.01); *B63J 2099/008* (2013.01)

(58) Field of Classification Search
None
See application file for complete search history.

(56) References Cited

U.S. PATENT DOCUMENTS

| | | | |
|---|---|---|---|
| 4,069,784 A * | 1/1978 | Hedstrom | B63H 25/02 114/144 E |
| 5,172,324 A * | 12/1992 | Knight | G05D 1/0206 114/144 E |
| 7,140,930 B2 | 11/2006 | Yamada et al. | |
| 7,166,003 B2 | 1/2007 | Motose | |
| 7,186,155 B2 * | 3/2007 | Nickerson | B63H 25/14 440/1 |
| 7,207,856 B2 | 4/2007 | Ishida et al. | |
| 7,364,480 B2 | 4/2008 | Ito et al. | |
| RE40,762 E | 6/2009 | Matsuda et al. | |
| 8,145,371 B2 * | 3/2012 | Rae | B63H 11/107 701/21 |
| 8,417,399 B2 * | 4/2013 | Arbuckle | B63B 39/00 701/1 |
| 8,924,054 B1 * | 12/2014 | Arbuckle | B63H 21/21 701/21 |
| 9,360,326 B2 * | 6/2016 | Hosokawa | G01C 21/203 |
| 9,690,295 B1 * | 6/2017 | Abellera | G05D 1/0206 |
| 2005/0263132 A1 | 12/2005 | Yanagihara | |
| 2006/0278152 A1 * | 12/2006 | Nickerson | B63H 25/14 114/144 R |
| 2007/0162207 A1 * | 7/2007 | Shimo | B63H 25/04 701/42 |

(Continued)

*Primary Examiner* — Christian Chace
*Assistant Examiner* — Edward Torchinsky
(74) *Attorney, Agent, or Firm* — Michael Best & Friedrich LLP

(57) ABSTRACT

Methods and systems for performing water slip control of a watercraft. One method includes determining, with an electronic processor, an intended path of the watercraft based on input received through an input device and an actual path of the watercraft based on data collected by at least one sensor mounted on the watercraft. The method also includes comparing, with the electronic processor, the actual path of the watercraft and the intended path of the watercraft automatically altering, with the electronic processor, at least one operating parameter of the watercraft when the actual path of the watercraft and the intended path of the watercraft differ by more than a predetermined threshold.

8 Claims, 3 Drawing Sheets

(56) References Cited

U.S. PATENT DOCUMENTS

2008/0027597 A1* 1/2008 Barrett ................... B63H 25/04
                                                        701/21
2011/0166724 A1* 7/2011 Hiramatsu ........... B63H 21/213
                                                        701/21

* cited by examiner

PERFORMING WATER SLIP CONTROL OF A WATERCRAFT

FIELD

Embodiments of the invention relate to methods and systems for performing water slip control of a watercraft, such as a jet ski.

BACKGROUND

Maneuvering a watercraft (for example, a jet ski) at high speeds poses numerous uncertainties in the operational limitations of the watercraft. For example, when the operator of watercraft turns the watercraft at a high speed, the watercraft may slip across the surface of the water. When the watercraft slips across the surface of the water, the watercraft does not travel along the operator's intended path (for example, the path associated with the operator's turn). To correct for the slipping, the operator may need to make numerous manual adjustments to the operation of the watercraft.

SUMMARY

Accordingly, embodiments provide methods and systems for performing water slip control of a watercraft. The methods and systems described herein reduce water slippage experienced by a watercraft by automatically adjusting an operational parameter of the watercraft. In some embodiments, the methods and systems allow an operator of the watercraft to have the throttle wide open (for example, operate the watercraft at a high speed) during a turn without experience excessive slippage.

One embodiment provides a method of performing water slip control of a watercraft. The method includes determining, with an electronic processor, an intended path of the watercraft, wherein the intended path of the watercraft is based on input received through an input device and an actual path of the watercraft based on data collected by at least one sensor mounted on the watercraft. The method also includes comparing, with the electronic processor, the actual path of the watercraft and the intended path of the watercraft, and automatically altering, with the electronic processor, at least one operating parameter of the watercraft when the actual path of the watercraft and the intended path of the watercraft differ by more than a predetermined threshold.

Another embodiment provides a system for performing water slip control of a watercraft. The system includes a sensor mounted on the watercraft and a controller including an electronic processor. The electronic processor is configured to determine an intended path of the watercraft based on input received through an input device and determine an actual path of the watercraft based on data collected by the sensor mounted on the watercraft. The electronic processor is also configured to compare the actual path of the watercraft and the intended path of the watercraft, and automatically operate a throttle of the watercraft when the actual path of the watercraft and the intended path of the watercraft differ by more than a predetermined threshold.

Yet another embodiment provides non-transitory computer-readable medium including instructions that, when executed by an electronic processor, cause the electronic processor to perform a set of functions. The set of functions includes determining an intended path of the watercraft, wherein the intended path of the watercraft is based on input received through an input device, and determining an actual path of the watercraft based on data collected by at least one sensor mounted on the watercraft. The set of functions also includes comparing the actual path of the watercraft and the intended path of the watercraft, and automatically altering at least one operating parameter of the watercraft based on a water surface condition when the actual path of the watercraft and the intended path of the watercraft differ by more than a predetermined threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include one or more electronic processors, one or more memory modules including non-transitory computer-readable medium, one or more input/output interfaces, and various connections (e.g., a system bus) connecting the components.

Figure 1:
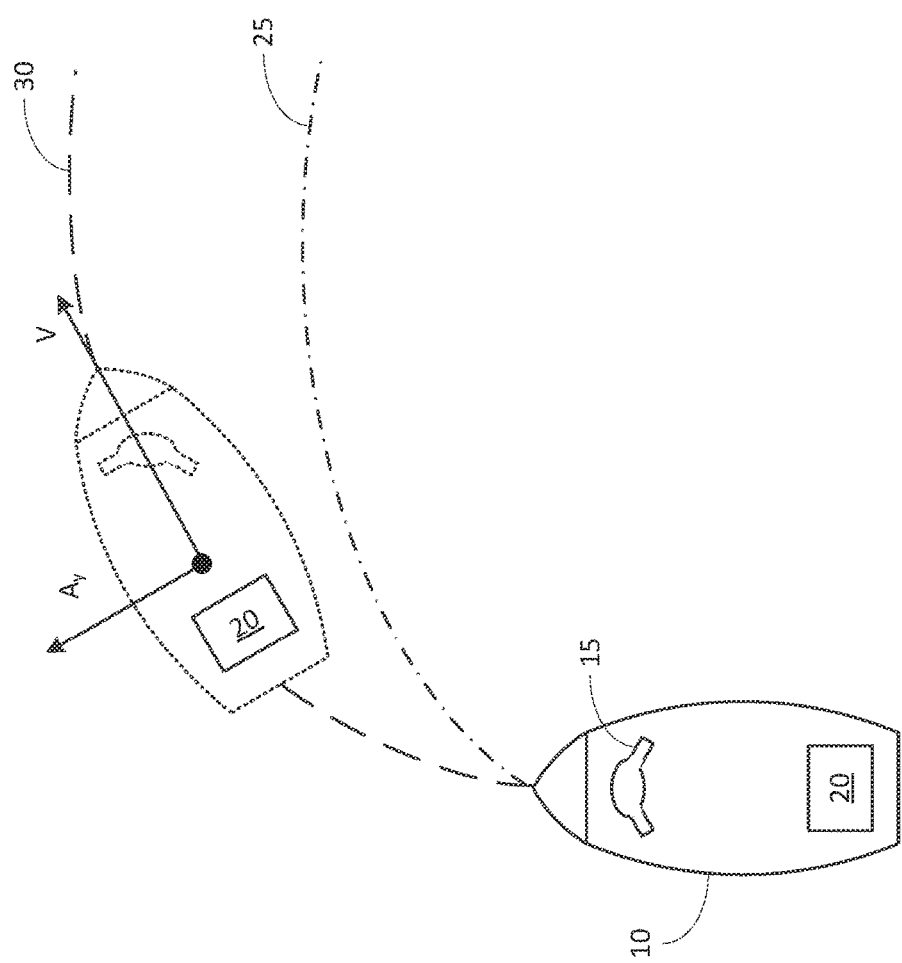
FIG. 1 schematically illustrates a watercraft traveling along an actual path in relation to an intended path.

FIG. 1 illustrates a watercraft 10 (for example, a jet ski). In the example illustrated, the watercraft 10 includes a steering device 15, a throttle (not shown), a rudder, and a controller 20, which controls an engine or other propulsion source for the watercraft 10. In some embodiments, the controller 20 controls an electric motor in place of or in addition to an engine. In some embodiments, the watercraft 10 includes additional or different components than those illustrated in FIG. 1. Also, the watercraft 10 illustrated in FIG. 1 is one example of a watercraft, and embodiments described herein may be used with any type of watercraft and are not limited to the example watercraft illustrated in FIG. 1.

In operation, the watercraft 10 travels across the surface of a body of water (for example, a lake, an ocean, and the like) in response to inputs provided by the operator of the watercraft 10 through one or more input devices (for example, altering the position of the throttle, altering the position of the steering device 15, and the like). For example, as illustrated in FIG. 1, the operator of the watercraft 10 may adjust the steering device 15 of the watercraft 10 to modify the path of the watercraft 10 so that the watercraft 10 travels along an intended path 25. However, when the watercraft 10 is traveling at a higher speed, the watercraft 10 may slip across the surface of the water. When the watercraft 10 slips across the surface of the water, the watercraft 10 may not travel along the intended path 25. Instead, as a result of the water slippage, the watercraft 10 may travel along an alternative path (for example, an actual path 30). As illustrated in FIG. 1, the intended path 25 and the actual path 30 may be different from each other. The difference between the intended path 25 and the actual path 30 may depend on, for example, the severity of the water slippage experienced by the watercraft 10. For example, the more water slippage experienced by the watercraft 10, the greater the difference between the intended path 25 and the actual path 30 and watercraft speed, turning radius, and a water surface condition may impact the slippage experienced by the watercraft 10.

Figure 2:
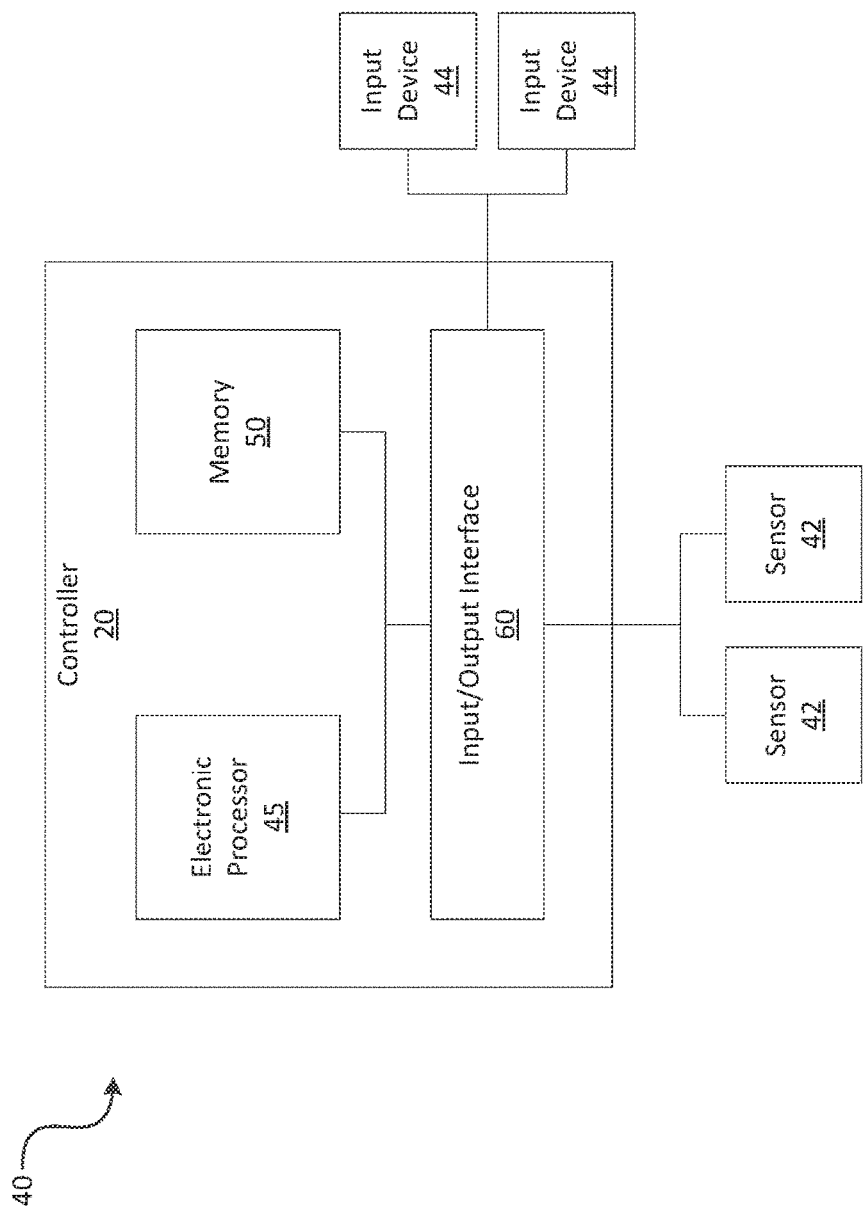
FIG. 2 schematically illustrates a system for performing water slip control of the watercraft of FIG. 1 in accordance with some embodiments.

FIG. 2 illustrates a system 40 for performing water slip control of the watercraft 10. The system 40 includes the controller 20, at least one sensor 42, and at least one input device 44. In some embodiments, the system 40 may include fewer, additional, or different components than illustrated in FIG. 2.

The controller 20 includes combinations of hardware and software that are operable to, among other things, perform the methods described herein. As noted above, the controller 20 may include an engine or motor controller. However, in other embodiments, the controller 20 may operate independently of a separate engine or motor controller included in the watercraft 10.

As illustrated in FIG. 2, the controller 20 includes an electronic processor 45 (for example, a microprocessor, application specific integrated circuit, or other suitable electronic device), a memory 50 (for example, one or more non-transitory computer-readable storage mediums), and an input/output interface 60. The electronic processor 45, the memory 50, the input/output interface 60, the at least one sensor 42, and the at least one input device 44 communicate over one or more control or data connections or buses. The controller 20 illustrated in FIG. 2 represents one example, and, in some embodiments, the controller 20 may include fewer, additional, or different components in different configurations than illustrated in FIG. 2. Also, in some embodiments, the controller 20 performs functionality in addition to the functionality described herein.

The electronic processor 45 is configured to retrieve instructions from the memory 50 and execute the instructions to perform a set of functions, including the methods described herein. The memory 50 may include combinations of different types of memory, such as read-only memory ("ROM"), random access memory ("RAM"), or another non-transitory computer readable medium. As noted above, the memory 50 stores instructions executable by the electronic processor 45. The memory 50 may also store data. Accordingly, the memory 50 may store firmware, one or more applications, program data, filters, rules, one or more program modules, and other executable instructions or data.

The input/output interface 60 allows the controller 20 to communicate with devices external to the controller 20 (for example, receive input and provide output to and from systems external to the controller 20). For example, the controller 20 may communicate with the at least one sensor 42, the at least one input device 44 mounted on the watercraft 10, or a combination thereof through the input/output interface 60. In some embodiments, the input/output interface 60 may include a port for receiving a wired connection to the at least one sensor 42, the at least one input device 44, or a combination thereof. Alternatively or in addition, the input/output interface 60 may include a transceiver for establishing a wireless connection to the at least one sensor 42, the at least one input device 44, or a combination thereof (for example, over a communication network, such as the Internet, a local area network ("LAN"), a wide area network, and the like). Alternatively or in addition, the input/output interface 60 may communicate with a communication bus (for example, a controller area network ("CAN")) to indirectly communicate with the at least one sensor 42, the at least one input device 44, or a combination thereof.

The at least one input device 44 may be configured to receive input from the operator of the watercraft 10. The input received through the at least one input device 44 may include input relating to the operation of the watercraft 10 (for example, a steering angle, a throttle valve position, and the like). For example, the at least one input device 44 may include the steering device 15, the throttle of the watercraft 10, or a combination thereof. The throttle may be a foot pedal, a throttle grip, a lever, or other device movable by an operator to control a speed of the watercraft 10. Similarly, the steering device 15 may include a rotatable wheel or one or more handlebars that allow an operator to control a direction of travel of the watercraft 10.

The at least one sensor 42 may be configured to collect data relating to the watercraft 10 (for example, velocity data, acceleration data, and the like). For example, the at least one sensor 42 may include, for example, a yaw sensor, an accelerometer, and the like. Also, in some embodiments, that at least one sensor 42 may include a sensor for detecting the position of an input device, such as a steering device position or a throttle position. In some embodiments, the at least one sensor 42, the at least one input device, or a combination thereof is included in the controller 20.

During operation of the watercraft 10, the controller 20 may be configured to receive input from the operator through the at least one input device 44 and control an operating parameter of the watercraft as instructed by the input. For example, the controller 20 may control (for example, directly or indirectly) a throttle valve of an engine included in the watercraft 10 to increase or decrease a speed of the watercraft 10 as requested by the operator through the throttle. Similarly, the controller 20 may control (for example, directly or indirectly) a rudder included in the watercraft 10 to change a direction of travel of the watercraft 10 as requested by the operator through the steering device 15.

Figure 3:
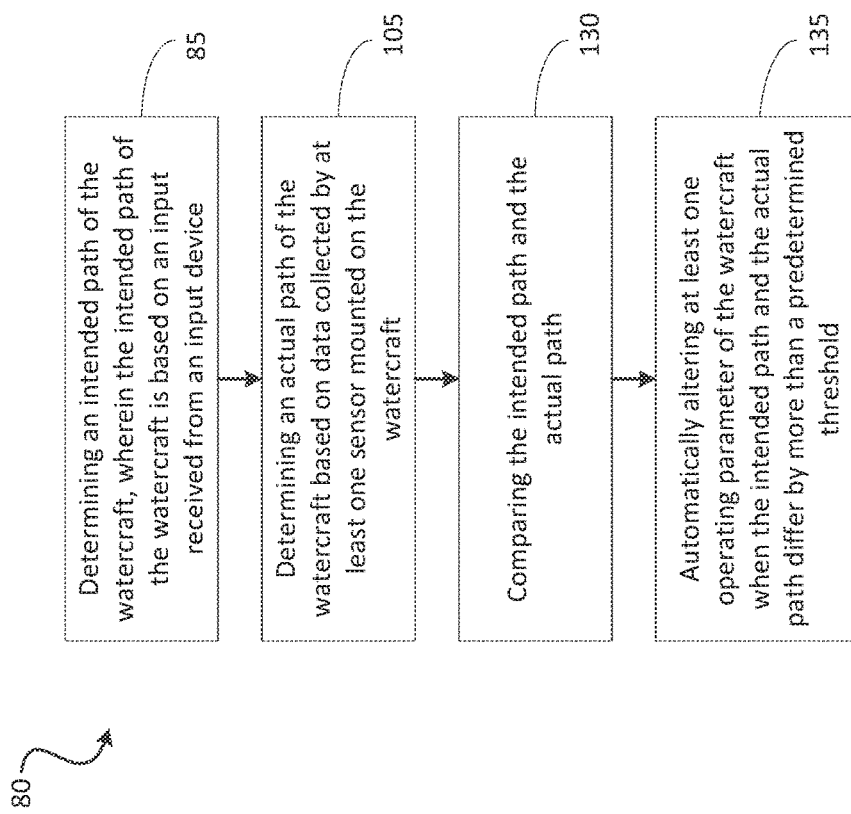
FIG. 3 is a flowchart illustrating a method for performing water slip control performed by the system of FIG. 2 in accordance with some embodiments.

As noted above, the electronic processor 45 included in the controller 20 executes instructions to perform water slip control of a watercraft. In particular, the electronic processor 45 executes instructions to perform one or more of the methods illustrated in FIG. 3. FIG. 3 is a flowchart illustrating a method 80 for performing water slip control of the watercraft 10 of FIG. 1 in accordance with some embodiments. As illustrated in FIG. 3, the method 80 includes determining, with the electronic processor 45, the intended path 25 of the watercraft 10 (at block 85). As mentioned above, the intended path 25 represents the path in which the operator of the watercraft 10 intends to travel. In some embodiments, the electronic processor 45 determines the intended path 25 of the watercraft 10 based on operator input (for example, received through one or more of the at least one input device 44).

For example, in some embodiments, the electronic processor 45 determines the intended path 25 by determining a current position of the steering device 15 of the watercraft 10. The current position of the steering device 15 represents the operator's current intended direction of travel (for example, forty-five degrees to the right from the operator's current direction of travel). In some embodiments, the electronic processor 45 determines the current position of the steering device 15 based on data collected by the at least one sensor 42, such as a steering angle sensor.

The electronic processor 45 may also determine the intended path 25 by determining a current position of the throttle of the watercraft 10. The current position of the throttle represents the operator's intended speed of the watercraft 10 (for example, thirty miles per hour). In some embodiments, the electronic processor 45 determines the current position of the throttle based on data collected by the at least one sensor 42, such as a throttle position sensor.

In response to determining the current position of the steering device 15 and the current position of the throttle, the electronic processor 45 determines the intended path 25 of the watercraft 10. For example, the electronic processor 45 may use the current position of the steering device 15 and the current position of the throttle to determine a current direction and a current speed, which the electronic processor 45 uses to determine the intended path 25 (assuming that the current direction and current speed remain constant).

As illustrated in FIG. 3, the method 80 also includes determining, with the electronic processor 45, the actual path 30 of the watercraft 10 (at block 105). As mentioned above, the actual path 30 represents a path the watercraft 10 actuals travels, which may differ from the intended path 25 due to water slippage. In some embodiments, the electronic processor 45 determines the actual path 30 based on data collected by the at least one sensor 42 mounted on the watercraft 10. For example, the electronic processor 45 may determine an acceleration (such as lateral acceleration) of the watercraft 10 (based on data collected by one or more accelerometers), a yaw rate of the watercraft 10 (based on data collected by one or more yaw rate sensors), a speed of the watercraft 10 (based on data collected by one or more speed sensors), a velocity of the watercraft 10 (based on data collected by one or more velocity sensors), or a combination thereof. For example, in some embodiments, the electronic processor 45 determines the actual path 30 based on data collected by a six dimensional sensor, which may collect three different yaw rates and three different accelerations, and one or more speed sensors.

Alternatively or in addition, in some embodiments, the electronic processor 45 determines the actual path 30 of the watercraft 10 based on position data received from a navigation satellite system (NSS), such as a Global Positioning System (GPS). The electronic processor 45 may use position data from a NSS to determine an actual speed and direction of the watercraft 10, the actual path 30 of the watercraft 10, or a combination thereof. In some embodiments, the electronic processor 45 uses position data from a NSS as a secondary source to compare the actual path 30 of the watercraft 10 determined based on collected sensor data (for verification purposes).

As illustrated in FIG. 3, the method 80 also includes comparing, with the electronic processor 45, the intended path 25 and the actual path 35 (at block 130). In some embodiments, the electronic processor 45 compares the intended path 25 and the actual path 35 to determine whether there is a difference between the paths. Also, in some embodiments, the electronic processor 45 determines whether a difference between the intended path 25 of the watercraft 10 and the actual path 30 of the watercraft 10 is greater than a predetermined threshold. The predetermined threshold may represent, for example, an acceptable degree of error between the intended path 25 of the watercraft 10 and the actual path 30 of the watercraft 10. For example, when the difference between the intended path 25 and the actual path 30 is greater than a predetermined threshold, the electronic processor 45 may determine the watercraft 10 is experiencing water slippage significantly impacting the operation of the watercraft 10. Conversely, when the difference between the intended path 25 and the actual path 30 is not greater than the predetermined threshold, the electronic processor 45 may determine that the watercraft 10 is experiencing minor or no water slippage.

The predetermined threshold may be a calibrated value or a variable value set by, for example, the operator of the watercraft 10. For example, the watercraft 10 may include a number of operating modes, such as a "fun" operating mode or a "racing" operating mode, selectable by the operator of the watercraft 10. The electronic processor 45 may set the predetermined threshold based on the current operating mode of the watercraft 10. Accordingly, in some embodiments, the electronic processor 45 determines a current operating mode of the watercraft 10 and sets the predetermined threshold based on the current operating mode of the watercraft 10. For example, when the operator of the watercraft 10 selects the racing operating mode, the electronic processor 45 may set the predetermined threshold to a first predetermined threshold that allows the watercraft 10 to experience a first amount of water slippage. Conversely, when the operator of the watercraft 10 selects a fun operating mode, the electronic processor 45 may set the predetermined threshold to a second predetermined threshold that allows the watercraft 10 to experience more water slippage than compared to the fun operating mode.

When the intended path 25 and the actual path 35 differ by more than the predetermined threshold, the watercraft 10 may be experiencing water slippage. Therefore, when the intended path 25 and the actual path 35 differ by more than a predetermined threshold, the method 80 includes automatically altering, with the electronic processor 45, at least one operating parameter of the watercraft 10 (at block 135). In some embodiments, the electronic processor 45 alters the at least one operating parameter of the watercraft 10 to maintain the intended path 25 of the watercraft 10 (for example, correct the actual path 35 of the watercraft 10 to be closer to the intended path 25).

The at least one operating parameter may include, for example, a throttle parameter, a rudder parameter, a drag parameter, a pitch parameter, or a combination thereof. For example, the electronic processor 45 may alter the at least one operating parameter by automatically operating a throttle valve of the watercraft 10, such as to reduce a speed of the watercraft 10. Alternatively or in addition, the electronic processor 45 may alter the at least one operating parameter by automatically operating the rudder of the watercraft 10, such as to change the direction of travel of the watercraft 10. Alternatively or in addition, the electronic processor 45 may alter the at least one operating parameter by automatically operating a drag device, such as to change the amount of drag on the left or right side of the watercraft 10 to steer the watercraft 10. In some embodiments, the electronic processor 45 automatically operates the drag device by lowering the drag device to various depth levels in the water. In other words, the amount of drag on the left or right side of the watercraft 10 may be determined based on the total surface area of the drag device within the water, which is varied based on the depth level of the drag device. Alternatively or in addition, the electronic processor 45 may alter the at least one operating parameter by automatically adjusting the pitch of the watercraft 10, such as to increase or decrease the pitch of the watercraft 10.

In some embodiments, the electronic processor 45 also determines what operating parameter to alter. For example, the electronic processor 45 may determine what operating parameter to alter based on the comparison of the intended path 25 of the watercraft 10 and the actual path 30 of the watercraft 10. The comparison between the intended path 25 of the watercraft 10 and the actual path 30 of the watercraft 10 may indicate the severity of water slippage experienced by the watercraft 10, and the like. Based on the comparison between the intended path 25 of the watercraft 10 and the actual path 30 of the watercraft 10, the electronic processor 45 may determine what operating parameter to alter and how much to alter the operating parameter.

In some embodiments, the electronic processor 45 alters the at least one operating parameter by a predetermined amount or for a predetermined period of time. In other embodiments, the electronic processor 45 alters the at least one operating parameter until the difference between the intended path 25 and the actual path 30 is reduced (e.g., within the predetermined threshold). Accordingly, the electronic processor 45 may be configured to repeatedly determine an intended and actual path of the watercraft 10 as described above to track how each path is changing.

In some embodiments, the electronic processor 45 of the controller 20 also determines the operating parameter to alter or an amount of alteration, based on a water surface condition. The water surface condition may indicate, for example, how rough the water surface is. Accordingly, the electronic processor 45 may determine a roll of the watercraft 10, a pitch of the watercraft 10, or a combination thereof. The electronic processor 45 may determine the roll of the watercraft 10, the pitch of the watercraft 10, or both based on, for example, data collected by the at least one sensor 42.

Additionally, in some embodiments, the electronic processor 45 of the controller 20 may use the determined roll of the watercraft 10 and the determined pitch of the watercraft 10 to determine a sitting position of the watercraft 10 on the water surface. How the watercraft 10 is sitting in the water may impact the effectiveness of operating parameter alterations. For example, when the watercraft 10 is sitting level on the water surface, the operating parameter alterations may be more effective than when the watercraft 10 is not sitting level on the water surface. Accordingly, the electronic processor 45 may determine the operating parameter to alter or the amount of alteration based on the sitting position of the watercraft 10.

Thus, the invention provides, among other things, methods and systems for performing water slip control of a watercraft by comparing an intended path and an actual path. When these paths differ, operation of the watercraft is automatically altered to bring the paths more in line. For example, the throttle valve or rudder of the watercraft may be automatically operated to bring the paths more in line. In some embodiments, the automatic operation may be based on a water surface condition. Various features and advantages of the invention are set forth in the following claims.

What is claimed is:

1. A method for performing water slip control of a watercraft, the method comprising:
   determining an operator-selected operating mode of the watercraft;
   setting a predetermined threshold based on the determined operating mode of the watercraft, wherein the determined operating mode includes one of a fun operating mode and a racing operating mode, wherein the fun operating mode sets the predetermined threshold to allow the watercraft to experience more water slippage than for the racing operating mode;
   determining, with an electronic processor, an intended turning path of the watercraft, wherein the intended turning path of the watercraft is based on input received through an input device;
   determining, with the electronic processor, an actual turning path of the watercraft based on data collected by at least one sensor mounted on the watercraft;
   comparing, with the electronic processor, the actual turning path of the watercraft and the intended turning path of the watercraft; and
   automatically altering, with the electronic processor, at least one operating parameter of the watercraft when the actual turning path of the watercraft and the intended turning path of the watercraft differ by more than the predetermined threshold due to water slippage.

2. The method of claim 1, wherein determining the intended turning path of the watercraft includes:
   determining a current position of a steering device of the watercraft,
   determining a current position of a throttle of the watercraft, and
   determining the intended turning path of the watercraft based on the current position of the steering device and the current position of the throttle of the watercraft.

3. The method of claim 1, wherein determining the actual turning path of the watercraft includes:
   determining a lateral acceleration of the watercraft,
   determining a velocity of the watercraft,
   determining a yaw rate of the watercraft, and
   determining the actual turning path of the watercraft based on the lateral acceleration of the watercraft, the velocity of the watercraft, and the yaw rate of the watercraft.

4. The method of claim 1, wherein determining the actual turning path of the watercraft includes:
   receiving position data from a navigation satellite system, and determining the actual turning path of the watercraft based on the received position data.

5. The method of claim 1, wherein altering the at least one operating parameter of the watercraft includes altering at least one selected from the group consisting of a rudder parameter, a pitch parameter, and a drag parameter.

6. The method of claim 1, wherein altering the at least one operating parameter of the watercraft includes:
determining a roll of the watercraft,
determining a pitch of the watercraft,
determining a water surface condition based on the roll of the watercraft and the pitch of the watercraft, and
altering the at least one operating parameter based on the water surface condition.

7. The method of claim 1, wherein altering the at least one operating parameter of the watercraft includes:
determining a roll of the watercraft,
determining a pitch of the watercraft,
determining a sitting position of the watercraft based on the roll of the watercraft and the pitch of the watercraft, and
altering the at least one operating parameter based on the sitting position of the watercraft.

8. The method of claim 1, wherein altering the at least one operating parameter of the watercraft includes altering the at least one operating parameter to maintain the intended turning path of the watercraft, and wherein the watercraft is a jet ski.

* * * * *